Figure 1:
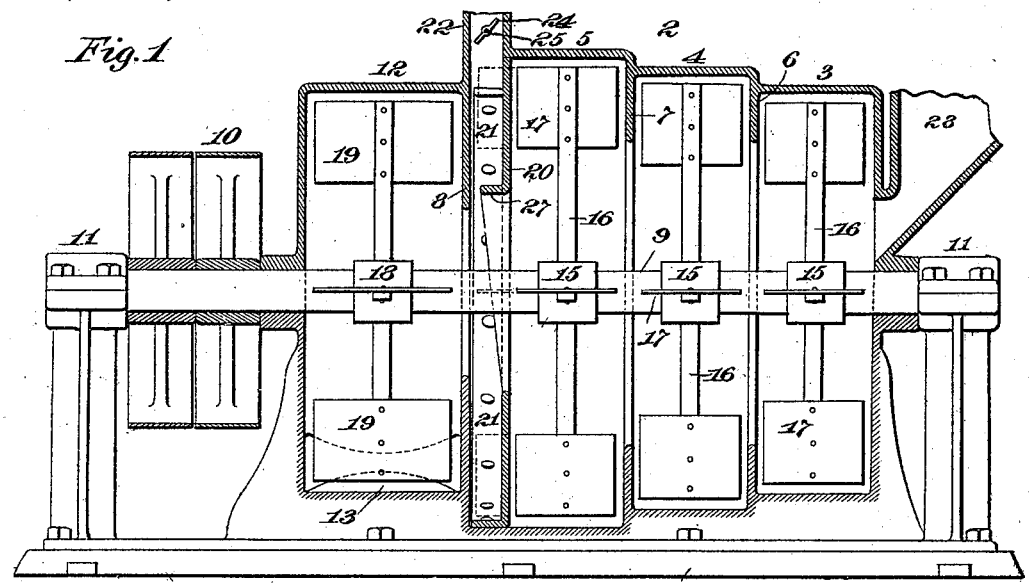

No. 635,114. Patented Oct. 17, 1899.
W. M. WHEILDON.
PULVERIZER.
(Application filed Jan. 7, 1899.)
(No Model.)

Witnesses:

Inventor
William Maxwell Wheildon
by Rich. N. Dyer
Att'y.

THE NORRIS PETERS CO., PHOTO-LITHO., WASHINGTON, D. C.

UNITED STATES PATENT OFFICE.

WILLIAM MAXWELL WHEILDON, OF BOSTON, MASSACHUSETTS, ASSIGNOR TO THE AERO-PULVERIZER COMPANY, OF JERSEY CITY, NEW JERSEY.

PULVERIZER.

SPECIFICATION forming part of Letters Patent No. 635,114, dated October 17, 1899.

Application filed January 7, 1899. Serial No. 701,458. (No model.)

*To all whom it may concern:*

Be it known that I, WILLIAM MAXWELL WHEILDON, a citizen of the United States, residing at Boston, in the county of Suffolk and State of Massachusetts, have invented a certain new and useful Improvement in Pulverizers, (Case D,) of which the following is a specification.

My invention relates to various new and useful improvements in pulverizers adapted especially for the purpose of reducing to an impalpable powder a combustible material, such as coal or coke, and for forcing the pulverized material, with the proper proportion of air as to result in perfect combustion, to the point of use—as, for instance, the firebox of a boiler. The improvements are not limited to use for the pulverization of combustible material and may be employed with any pulverizable substance.

The class of pulverizers to which the invention preferably relates is that employing a series of concentric chambers of gradually-increasing diameters from the feed end to the discharge end of the device. A horizontal shaft is mounted centrally within these chambers and carries a series of spider-arms, to the ends of which paddles are secured, said paddles working in the concentric chambers. Separating the respective chambers are diaphragms, between which and the shaft openings are formed for the passage of pulverized material successively through the apparatus. At the discharge end of the device a fan is carried in a fan-chamber concentric with the pulverizing-chambers and on the same shaft, for producing a flow of air through the apparatus, by reason of which the material in course of pulverization will pass successively through the chambers and in a fine condition will be ejected from the apparatus intermixed with air to the point of use. I have made many experiments with pulverizing apparatus of this type. I have found, as a result of these experiments, that when a sufficient amount of air is caused to be drawn through the apparatus as to result in a mixture which will give perfect combustion the movement of the material during the pulverization through the apparatus will be relatively rapid, and the material in consequence will not be reduced to its ultimate condition of fineness, as is desirable. On the other hand, if the material is allowed to pass through the apparatus with sufficient slowness to be reduced to the desired condition of fineness the air which will be necessarily mixed therewith will be insufficient to cause perfect combustion. I have invented a pulverizing apparatus of the type referred to wherein the material will be allowed to pass through the apparatus at the proper rate of speed to result in its being reduced to an impalpable powder of the desired fineness, and at the same time the material so pulverized will be mixed with exactly the correct proportion of air to result in absolutely perfect combustion. When the invention is used in connection with non-combustible material, the increased quantity of air which will be expelled with the products of pulverization may be effectively utilized for any desired purpose—as, for example, the grading or sorting of the products by gravity.

The object of my invention therefore is to produce a pulverizing apparatus of this kind wherein the material will be reduced to the finest possible condition and will be forced to the place of use intimately intermixed with an increased quantity of air, which in the case of combustible material will be in the correct proportion as to result in absolutely perfect combustion.

In carrying out my invention I provide a pulverizing apparatus having the characteristics above indicated, and I interpose between the fan and the pulverizing-chamber nearest the discharge end an auxiliary or supplemental air-supply, which preferably is regulable. In this way I am enabled to use for the purpose of effecting the proper pulverization of the material only the requisite amount of air necessary for that purpose, the additional quantity of air being added to the pulverized material after its pulverization, but before entering the fan-chamber. Preferably the auxiliary or supplemental air-supply will be so applied to the pulverized material as to be intimately and completely intermixed therewith, whereby I am enabled to expel from the fan-chamber a mixture of pulverized material and air of absolute uniformity and of exactly the correct proportions to result in perfect combustion.

In order that my invention may be better understood, attention is directed to the accompanying drawings, forming a part of this specification, and in which—

Figure 2:
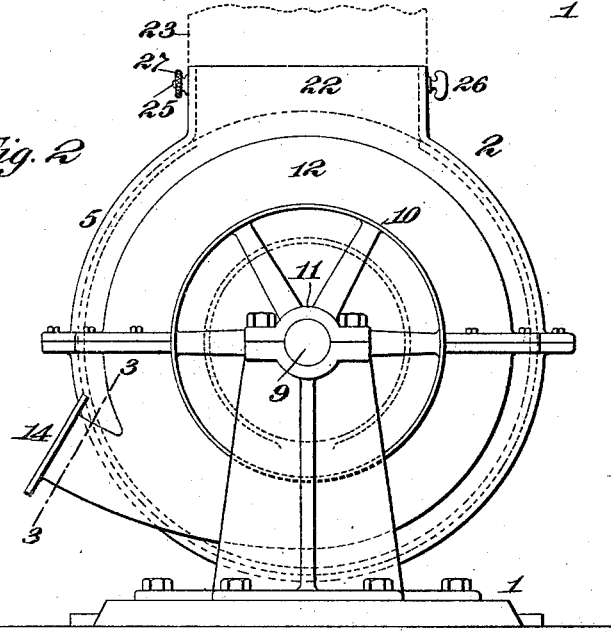
Figure 3:
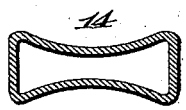
Figure 4:
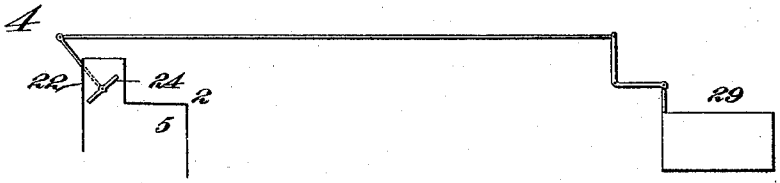

Figure 1 is a vertical sectional view through a pulverizing apparatus of the type referred to, illustrating the application thereto of my present improvements; Fig. 2, an end elevation thereof; Fig. 3, a vertical section through the twyer, and Fig. 4 a diagrammatic view.

In all of the above views corresponding parts are represented by the same numerals of reference.

1 is a base upon which is securely bolted the pulverizing device 2. This pulverizing device in the present instance comprises three concentric pulverizing-chambers 3, 4 and 5, of successively increasing diameters, as shown. These pulverizing-chambers are arranged concentrically with respect to each other. The chambers 3 and 4 are divided by a partition 6. The chambers 4 and 5 are divided by a partition 7, and at the end of the pulverizing-chamber 5, considered as an entirety, is a partition 8. Mounted centrally in the apparatus is a driving-shaft 9, driven in any suitable way—as, for example, by a hand-wheel 10. The shaft may be mounted in separate bearings 11 11 or in bearings formed at the ends of the pulverizing apparatus itself. The openings in the partitions or diaphragms 6 and 7 and surrounding the shaft 9 are preferably of the same diameter, while the opening in the diaphragm 8 is preferably considerably smaller, as shown. I prefer to mount a fan-chamber 12 at the side of the pulverizing-chamber 5, and into which the pulverized material may pass through the opening in the diaphragm or partition 8. The fan-chamber 12 has a discharge-opening 13 therein, arranged tangentially with respect to the same, and this discharge-opening 13 connects with a discharge-pipe 14, leading to the fire-box or elsewhere. Keyed on the shaft 9 within each of the pulverizing-chambers 3, 4, and 5 is a sleeve 15, carrying spider-arms 16. On the end of each of said spiders is a paddle or pulverizer 17. The spider-arms in the pulverizing-chambers are of correspondingly-increasing lengths, so that the paddles or pulverizers 17 in each chamber will be located a correspondingly-increased distance from the shaft 9. Hence in operation the paddles or pulverizers in the pulverizing-chamber 4 will partake of a higher velocity than those in the pulverizing-chamber 3, and the paddles in the pulverizing-chamber 5 will be operated at a higher velocity than those in the chamber 4. By reason of this construction the material passing through the apparatus will be successively reduced in fineness, as is well known. Keyed to the shaft 9 within the fan-chamber 12 is a sleeve 18, carrying fan-blades 19 in the usual way.

The pulverizing-chamber 5 is preferably of a greater width than the other pulverizing-chambers. When my improved pulverizing apparatus is used for the pulverization of non-combustible material, such as cement, the paddles or pulverizers 17 in said chamber will preferably occupy almost the entire internal width, as shown in dotted lines, since with such material such a supply of air only is necessary as will result in effecting a sufficiently slow movement to result in the proper pulverization. When, however, it is desired that a greater quantity of air should be added to the material than is required for effecting the movement thereof through the pulverizing-chambers, I secure within the pulverizing-chamber a supplemental diaphragm or partition 20, bolted or riveted firmly in place and having an opening at its center concentric with the shaft 9, which opening is preferably somewhat larger than the opening in the partition or diaphragm 8, but smaller than the openings in the partitions 6 and 7. Between the diaphragm 8 and the supplemental diaphragm 20 an air-chamber 21 will be formed. The air-chamber 21 is continued at its upper portion to form a neck 22, through which the air-supply enters. If a hot blast is desired, a pipe 23 (dotted lines) may be connected to the mouth of the neck and with any desired source of supply. In order to regulate the quantity of air entering the air-chamber 21, any suitable form of valve may be employed, such as the damper 24, mounted on a shaft 25 and operated by a thumb-piece 26 or any other desired handle. A lock-nut 27 may be carried on one end of the shaft to maintain the damper in any desired position. Preferably the supplemental diaphragm is provided with a cast flange 27, partially surrounding the opening therein, as shown, said flange being of its greatest width at its top and gradually tapering therefrom. By means of this flange the air-supply will be more evenly distributed around the shaft instead of passing directly from the air-inlet through the upper portion of the opening in the diaphragm 8. Material is fed to the apparatus through a chute 28 by any convenient form of feeding device.

Usually the feeding device is provided with a slide by means of which the air entering with the material into the pulverizer may be suitably regulated, as I have described and claimed in applications for Letters Patent, filed December 9, 1898, and numbered serially 698,715, 698,716, and 698,717. It is desirable in some instances that the main air-supply may be simultaneously varied with the supplemental air-supply, so that both supplies will always bear the proper relation to each other, while the quantity of admitted air will be varied to suit the exigencies of use. To effect this result, the slide 29, Fig. 4, of the feed device may be connected to the damper 24 by suitable levers and connecting-rods, as shown in said figure, whereby the two regulating devices controlling the main and supplemental air-supplies may be simultaneously moved by a single manually or automatically operated mechanism.

The exit-pipe from the fan-chamber is made generally rectangular in cross-section, as shown in Fig. 1, and the supply-pipe leading therefrom is generally circular in cross-section. When the apparatus is employed for the feeding of pulverized combustible material to a fire-box, it is desirable that the stream of material and air entering the fire-box should be as thin as possible in its vertical dimension. By forcing into the fire-box a very thin flat sheet of pulverized material and air I am enabled to effect a very perfect combustion. I therefore prefer to employ a twyer the bore of which is very short in a vertical direction, but of a considerable horizontal width. If a twyer were used having a bore rectangular in cross-section, the material passing through the exit-pipe would tend to be concentrated at the central part of the twyer and would not be distributed evenly throughout the entire surface. In order to overcome this, I make use of an exit pipe or twyer having a cross-sectional area substantially like that illustrated in Fig. 3, the top and bottom walls being concaved. This offers a retardation at the center to the flow and causes an accurate distribution from the entire mouth of the twyer into the fire-box.

The operation of my improved device will be as follows, assuming it to be used for the pulverization of a combustible material, such as coal: Power will be applied to the shaft 9 to rotate it at the proper speed. A mixture of the material to be pulverized and air will be introduced through the chute 28. The fan-blades 19 produce a suction through the apparatus from the entrance to the discharge end thereof. The material entering the pulverizing-chamber 13 will be pulverized by the paddles 17 therein. As this material is reduced in fineness it is carried by the air-currents through the opening in the partition or diaphragm 6 and enters the pulverizing-chamber 4. Here, owing to the increased speed of the pulverizing-paddles, the material is further reduced and thence passes through the opening in the diaphragm 7 to the pulverizing-chamber 5, where, owing to the increased speed of the pulverizing-paddles therein, it is reduced to its ultimate condition of fineness. From the pulverizing-chamber 5 the material is drawn by the air-currents through the opening in the supplemental partition or diaphragm 20 and thence through the opening in the diaphragm 8 into the fan-chamber, from which it is expelled through the opening 13 into the exit-pipe 14. The operation of the fan will obviously create a partial vacuum in the air-chamber 21, and the proper additional quantity of air will enter said chamber through the neck 22. This additional supply of air will be intimately admixed with the mixture of air and material passing from the opening in the supplemental diaphragm 20 to the opening in the diaphragm 8, the mixture being completed by the movements of the fan-blades in the fan-chamber. By making the opening in the diaphragm 8 smaller than the opening in the supplemental diaphragm 20 the material in passing through the last-mentioned opening will strike the diaphragm 8 and a baffle effect will be thus secured, the mixture being interrupted in its movements and an opportunity being offered for an intimate admixture between it and the supplemental supply.

Having now described my invention, what I claim as new, and desire to secure by Letters Patent, is as follows:

1. In a pulverizing apparatus, the combination with a series of pulverizing-chambers and pulverizers therein, of means for introducing into the pulverizing-chambers material to be pulverized and a sufficient quantity of air as to result in perfect pulverization, means for introducing into the mixture of air and pulverized material an additional supply of air and a single fan for creating both air-supplies, substantially as set forth.

2. In a pulverizing apparatus, the combination with a series of pulverizing-chambers and pulverizers therein, of means for introducing into the pulverizing-chambers material to be pulverized and a sufficient quantity of air as to result in perfect pulverization, means for introducing into the mixture of air and pulverized material an additional and regulable supply of air and a single fan for creating both air-supplies, substantially as set forth.

3. In a pulverizing apparatus, the combination with a series of pulverizing-chambers, a series of pulverizers therein, a fan-chamber adjacent to the discharge end of the pulverizing-chambers, and a fan in said fan-chamber, of means for introducing into the pulverizing-chambers a supply of material and air sufficient for pulverization, and an air-chamber located between the pulverizing-chambers and the fan-chamber for introducing into the mixture of air and pulverized material passing from the pulverizing-chambers to the fan-chamber an additional supply of air, substantially as set forth.

4. In a pulverizing apparatus, the combination with a series of pulverizing-chambers, a series of pulverizers therein, a fan-chamber adjacent to the discharge end of the pulverizing-chambers, and a fan in said fan-chamber, of means for introducing into the pulverizing-chambers a supply of material and air sufficient for pulverization, an air-chamber located between the pulverizing-chambers and the fan-chamber for introducing into the mixture of air and pulverized material passing from the pulverizing-chambers to the fan-chamber an additional supply of air, and means for regulating the supply of air entering said air-chamber, substantially as set forth.

5. In a pulverizing apparatus, the combination with a series of pulverizing-chambers, a series of pulverizers therein, a fan-chamber adjacent to the discharge end of the pulverizing-chambers, and a fan in said fan-chamber, of means for introducing into the pulverizing-chambers a supply of material and air sufficient for pulverization, an air-chamber located between the pulverizing-chambers and the fan-chamber for introducing into the mixture of air and pulverized material passing from the pulverizing-chambers to the fan-chamber an additional supply of air, a passage leading into said air-chamber, and a valve or damper in said passage, substantially as set forth.

6. In a pulverizing apparatus, the combination with a series of pulverizing-chambers of gradually-increasing diameters, of a series of pulverizers mounted in said pulverizing-chambers, and a supplementary diaphragm or partition in the largest pulverizing-chamber, whereby an air-chamber will be formed therein, substantially as set forth.

7. In a pulverizing apparatus, the combination with a series of pulverizing-chambers of gradually-increasing diameters, of a series of pulverizers mounted in said pulverizing-chambers, and a supplementary diaphragm or partition removably mounted in the largest pulverizing-chamber, whereby an air-chamber will be formed therein, substantially as set forth.

8. In a pulverizing apparatus, the combination with a series of pulverizing-chambers of gradually-increasing diameters, of a series of pulverizers mounted in said pulverizing-chambers, a supplementary diaphragm or partition in the largest pulverizing-chamber whereby an air-chamber will be formed therein, an air-passage leading into said air-chamber, and means for closing and opening said passage, substantially as set forth.

9. In a pulverizing apparatus, the combination with a series of pulverizing-chambers of gradually-increasing diameters, of a series of pulverizers mounted in said pulverizing-chambers, a supplementary diaphragm or partition in the largest pulverizing-chamber whereby an air-chamber will be formed therein, an air-passage leading into said air-chamber, and a damper in said passage, substantially as set forth.

10. In a pulverizing apparatus, the combination with a series of pulverizing-chambers, of a series of pulverizers mounted in said pulverizing-chambers, a supplementary diaphragm or partition in one of said chambers whereby an air-chamber will be formed, a passage leading into said air-chamber, and a tapering flange on said supplementary diaphragm, substantially as set forth.

This specification signed and witnessed this 3d day of December, 1898.

WILLIAM MAXWELL WHEILDON.

Witnesses:
HELEN P. NELSON,
ALBERT E. LITTLE.